(12) United States Patent
Grassi

(10) Patent No.: US 11,714,655 B2
(45) Date of Patent: *Aug. 1, 2023

(54) PIPELINE MERGING IN A CIRCUIT

(71) Applicant: Micron Technology, Inc., Boise, ID (US)

(72) Inventor: Michael Grassi, Shokan, NY (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,426

(22) Filed: Aug. 3, 2022

(65) Prior Publication Data

US 2022/0374242 A1  Nov. 24, 2022

Related U.S. Application Data

(63) Continuation of application No. 17/074,716, filed on Oct. 20, 2020, now Pat. No. 11,409,533.

(51) Int. Cl.
| | |
|---|---|
| *G06F 9/38* | (2018.01) |
| *G06F 7/02* | (2006.01) |
| *G06F 9/54* | (2006.01) |
| *G06F 9/30* | (2018.01) |

(52) U.S. Cl.
CPC .............. *G06F 9/3869* (2013.01); *G06F 7/02* (2013.01); *G06F 9/30029* (2013.01); *G06F 9/544* (2013.01)

(58) Field of Classification Search
CPC ...... G06F 9/3869; G06F 7/02; G06F 9/30029; G06F 9/544
See application file for complete search history.

(56) References Cited

U.S. PATENT DOCUMENTS

| | | | |
|---|---|---|---|
| 5,261,063 | A | 11/1993 | Kohn et al. |
| 5,604,910 | A | 2/1997 | Kojima et al. |
| 5,625,834 | A | 4/1997 | Nishikawa |
| 8,122,229 | B2 | 2/2012 | Wallach et al. |

(Continued)

FOREIGN PATENT DOCUMENTS

| | | |
|---|---|---|
| CN | 105786665 A | 7/2016 |
| CN | 106104488 A | 11/2016 |

(Continued)

*Primary Examiner* — Zachary K Huson
(74) *Attorney, Agent, or Firm* — Schwegman Lundberg & Woessner, P.A.

(57) ABSTRACT

Devices and techniques for pipeline merging in a circuit are described herein. A parallel pipeline result can be obtained for a transaction index of a parallel pipeline. Here, the parallel pipeline is one of several parallel pipelines that share transaction indices. An element in a vector can be marked. The element corresponds to the transaction index. The vector is one of several vectors respectively assigned to the several parallel pipelines. Further each element in the several vectors corresponds to a possible transaction index with respective elements between vectors corresponding to the same transaction index. Elements between the several vectors that correspond to the same transaction index can be compared to determine when a transaction is complete. In response to the transaction being complete, the result can be released to an output buffer in response to the transaction being complete.

20 Claims, 6 Drawing Sheets

(56) References Cited

U.S. PATENT DOCUMENTS

| | | |
|---|---|---|
| 8,156,307 B2 | 4/2012 | Wallach et al. |
| 8,205,066 B2 | 6/2012 | Brewer et al. |
| 8,423,745 B1 | 4/2013 | Brewer |
| 8,561,037 B2 | 10/2013 | Brewer et al. |
| 9,710,384 B2 | 7/2017 | Wallach et al. |
| 10,990,391 B2 | 4/2021 | Brewer |
| 10,990,392 B2 | 4/2021 | Brewer |
| 11,163,564 B1 | 11/2021 | Stewart et al. |
| 11,409,533 B2 * | 8/2022 | Grassi ................ G06F 9/30029 |
| 2007/0074009 A1 | 3/2007 | Donofrio et al. |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2015/0143350 A1 | 5/2015 | Brewer |
| 2015/0206561 A1 | 7/2015 | Brewer et al. |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0104164 A1 | 4/2020 | Pawlowski et al. |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |
| 2022/0121449 A1 | 4/2022 | Grassi |

FOREIGN PATENT DOCUMENTS

| | | |
|---|---|---|
| CN | 108292232 A | 7/2018 |
| CN | 114385538 A | 4/2022 |
| WO | WO-2010051167 A1 | 5/2010 |
| WO | WO-2013184380 A2 | 12/2013 |
| WO | WO-2019191740 A1 | 10/2019 |
| WO | WO-2019191742 A1 | 10/2019 |
| WO | WO-2019191744 A1 | 10/2019 |
| WO | WO-2019217287 A1 | 11/2019 |
| WO | WO-2019217295 A1 | 11/2019 |
| WO | WO-2019217324 A1 | 11/2019 |
| WO | WO-2019217326 A1 | 11/2019 |
| WO | WO-2019217329 A1 | 11/2019 |
| WO | WO-2019089816 A3 | 4/2020 |

* cited by examiner

PIPELINE MERGING IN A CIRCUIT

PRIORITY APPLICATION

This application is a continuation of U.S. application Ser. No. 17/074,716, filed Oct. 20, 2020, which is incorporated herein by reference in its entirety.

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets can be packaged together to facilitate interconnection with other components of a larger system. Each chiplet can include one or more individual integrated circuits (ICs), or "chips", potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics can be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
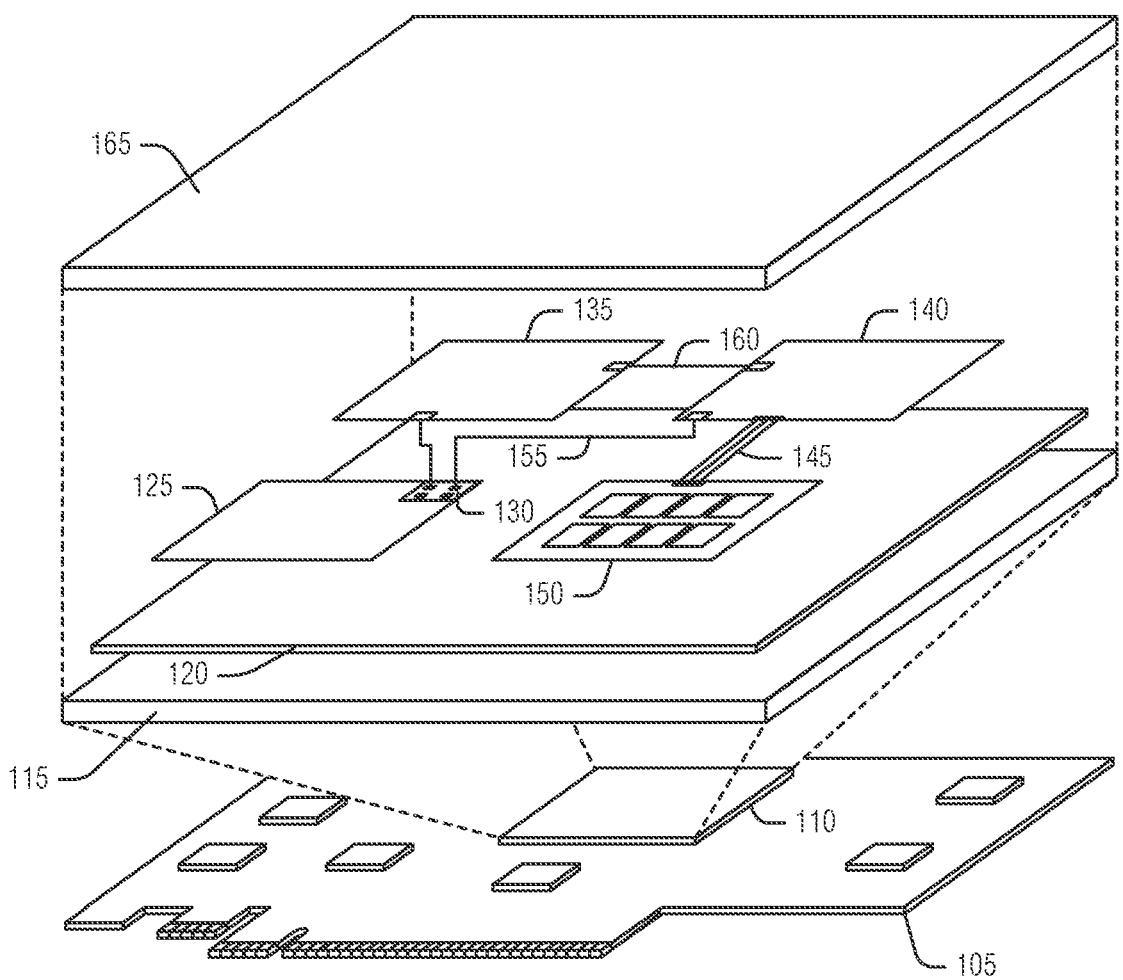
FIGS. 1A and 1B illustrate an example of a chiplet system, according to an embodiment.

FIG. 1, described below, offers an example of a chiplet system and the components operating therein. The illustrated chiplet system includes a memory controller. Additional details about the memory controller are described below with respect to FIGS. 1 and 2. In an example, the memory controller can include a local cache for the off-die memory (e.g., dynamic random access memory (DRAM)), an example illustrated in FIG. 2. Generally, in such an arrangement, a memory request is received at the memory controller. The memory controller then attempts to satisfy the memory request from the cache and falls back on the off-die memory when the memory controller cannot satisfy the memory request from the cache. Generally, in relation to each other, the cache is a fast path (e.g., low latency) and the off-die memory is a slow path. Because some memory requests will be satisfied from the cache, some memory requests will be satisfied from the off-die memory, and some memory requests will be satisfied by a combination of both the cache and the off-die memory, an issue can arise in combining and coordinating these actions for the memory requests.

Although the issue is posed in the context of a memory request, in any system where operations can take one or more parallel paths that eventually need to be combined or coordinated and forwarded into a single pipeline, the issue can be present. To address these issues, vectors can be used to independently and asynchronously track transaction (e.g., memory request) completion through the various paths. Once transactions are complete, the components of the transaction can be merged and delivered, maintaining integrity across transactions despite varying response times for the different paths. This technique can accommodate a relatively large number of in-flight operations that can have vastly different ordering.

The disparity in response time and ordering causes these sub-completion logging vectors to be relatively long. In addition, it's possible that multiple new sub-completions can occur simultaneously which then can indicate multiple final completions are ready simultaneously. To accomplish this, the logging vectors can include a transaction bit component—represented as a bit-vector with an index for each supported transaction—with one vector for each path. As a path completes for a given transaction, the index corresponding to the transaction in the bit-vector for the path is set to a logical one. Here, a bit-wise AND operation upon the bit-vectors for the paths can be performed each clock cycle. The index corresponding to the transaction in the vector resulting from the bit-wise AND between the logging vectors will indicate that the transaction is complete when it is a logical one. In this manner, a computationally efficient technique is employed to determine when the components of a transaction are ready for merging. Generally, the multiple vectors are long enough (e.g., 256 bits) to cover the number of cycles, events, or time that that can elapse between multiple related operations in a transaction that will be combined or coordinated.

Once the transaction is complete, the component results—which have been buffered until this time—can be released on an output path (e.g., a memory response to the memory request). For example, in the case of two path logging vectors, two first-in-first-out queues (FIFOs) can be used to hold final completions (e.g., complete transactions) as they happen. The number and depth of the FIFOs is generally relative to how many simultaneous final completions can be generated per cycle. Thus, if two transactions complete in a single cycle, both can be written to a FIFO within that cycle, a first transaction to a first FIFO and the second transaction to the second FIFO. In an example, the FIFOs can be written and read in strict round-robin order. This ensures that all completions are serviced in the order that they occur.

Once a transaction result is read out from a FIFO, the processing goes forward into the next stage of an output path. Thus, in the memory request scenario, the final path includes the construction and transmission of the memory response that corresponds to the memory request. This technique provides an efficient and robust mechanism to merge multiple paths with disparate response times. The technique can be reasonably executed in a single cycle, is fair to the various transactions, and can be expanded to any number of parallel paths needing coordination. This last point causes the technique to be superior to some other score boarding techniques. Additional details and examples are provided below.

Figure 1B:
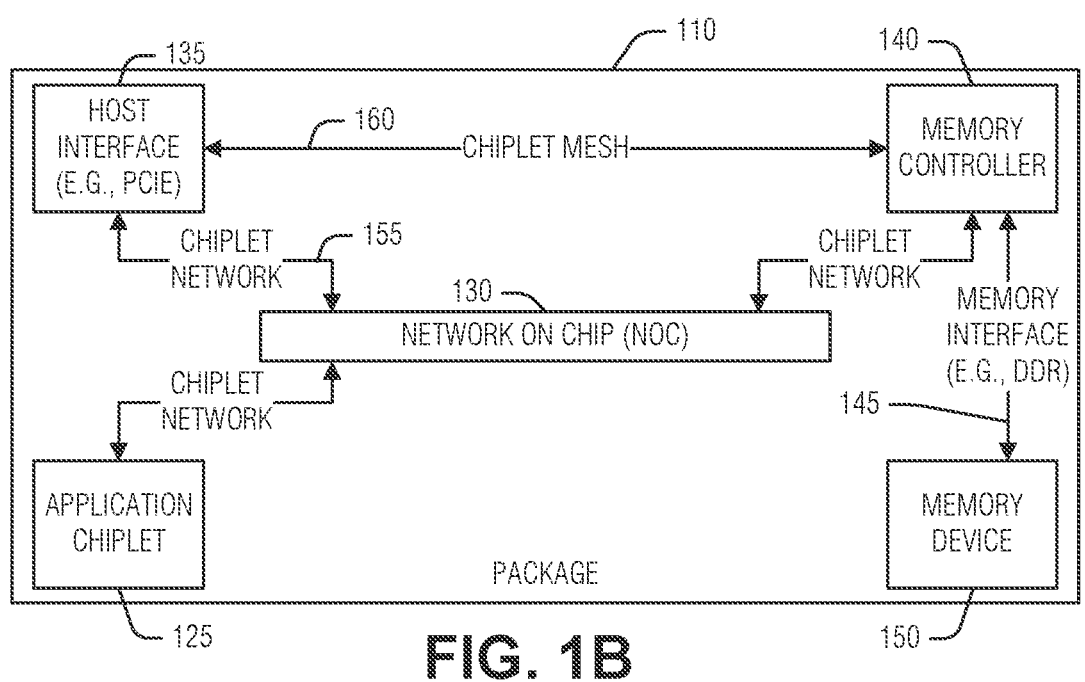

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems can include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 can be included on the application chiplet 125. In an example, NOC 130 can be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface can be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operator execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 140. In other chiplet systems, the atomic operators can be performed by other chiplets. For example, an atomic operator of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operators avoid transmitting the data across the chiplet network 160, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets can be provided. In an example, these memory device chiplets can each implement one or multiple storage technologies. In an example, a memory chiplet can include, multiple stacked memory die of different technologies, for example one or more static random access memory (SRAM) devices stacked or otherwise in communication with one or more dynamic random access memory (DRAM) devices. Memory controller 140 can also serve to coordinate operations between multiple memory chiplets in chiplet system 110; for example, to utilize one or more memory chiplets in one or more levels of cache storage, and to use one or more additional memory chiplets as main memory. Chiplet system 110 can also include multiple memory controllers 140, as can be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
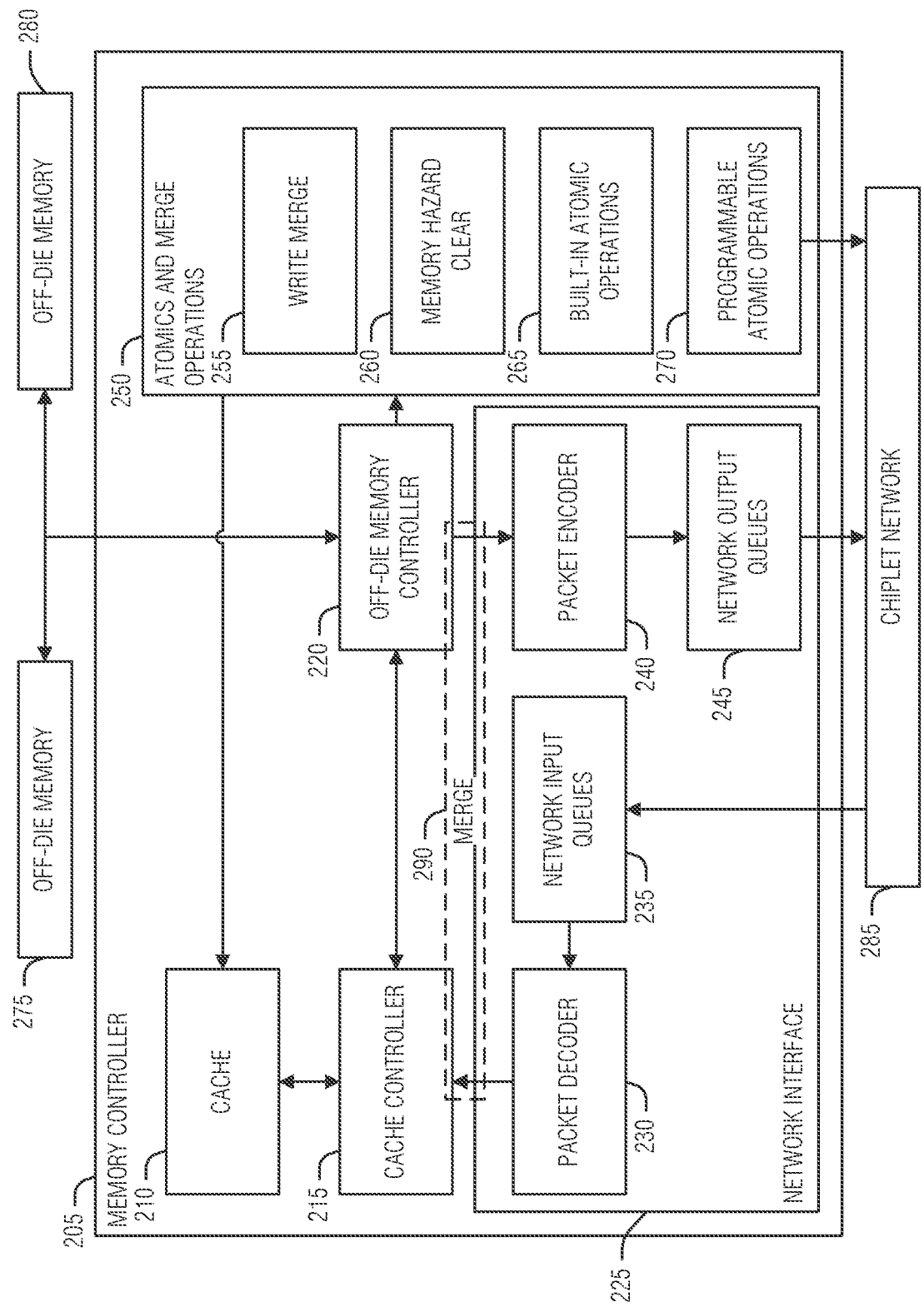
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), merge circuitry 290, and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples can be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and can be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache can also be implemented in off-die memories 275 or 280; and in some such examples can be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operator, the built-in atomic unit 265 receives the request and reads data, either from the write merge unit 255 or directly from the off-die memory controller 220. The atomic operator is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operators such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operator performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operators can also involve requests for a "standard" atomic operator on the requested data, such as comparatively simple, single cycle, integer atomics—such as fetch-and-increment or compare-and-swap—which will occur with the same throughput as a regular memory read or write operation not involving an atomic operator. For these operations, the cache controller 215 can generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic operator. Following the atomic operator, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operators (also referred to as "custom atomic transactions" or "custom atomic operators"), comparable to the performance of built-in atomic operators. Rather than executing multiple memory accesses, in response to an atomic operator request designating a programmable atomic operator and a memory address, circuitry in the memory controller chiplet 205 transfers the atomic operator request to PAU 270 and sets a hazard bit stored in a memory hazard register corresponding to the memory address of the memory line used in the atomic operator, to ensure that no other operation (read, write, or atomic) is performed on that memory line, which hazard bit is then cleared upon completion of the atomic operator. Additional, direct data paths provided for the PAU 270 executing the programmable atomic operators allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operators. When provided with the extended instruction set for executing programmable atomic operators, the PAU 270 can be embodied as one or more hybrid threading processors. In some example embodiments, the PAU 270 provides barrel-style, round-robin instantaneous thread switching to maintain a high instruction-per-clock rate.

Programmable atomic operators can be performed by the PAU 270 involving requests for a programmable atomic operator on the requested data. A user can prepare programming code to provide such programmable atomic operators. For example, the programmable atomic operators can be comparatively simple, multi-cycle operations such as floating-point addition, or comparatively complex, multi-instruction operations such as a Bloom filter insert. The programmable atomic operators can be the same as or different than the predetermined atomic operators, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operator. Following the atomic operator, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operators is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operator; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

The merge circuitry 290 is configured to merge various responses from the cache 210 and the off-die memory (e.g., off-die memory 275) in response to a memory request (e.g., received from the packet decoder 230) before delivery (e.g., via packet encoder 240) in a memory response. As illustrated, the merge circuitry 290 can have components in the cache controller 215, the off-die memory controller 220, or any other location in which memory requests (e.g., transactions) can be tracked and completed (e.g., merged).

As noted above, the response times between the cache 210 and the off-die memory can vary greatly, creating a challenge to track and reassemble responses for a memory request transaction. The achieve coordination between these various response pipelines in the memory controller 205, the merge circuitry 290 is configured to obtain a parallel pipeline result for a transaction index of a parallel pipeline. Here, the parallel pipeline is a member of a set of parallel pipelines that share transaction indices. Although various parallel pipelines can exist in the memory controller 205, an example of two such parallel pipelines are memory retrievals from the cache 210, and off-die memory. An example of a three-way parallel pipeline could include the cache 210, a fast off-die memory (e.g., off-die memory 275 is DRAM) and a slow off-die memory (e.g., off-die memory 280 is flash). Sharing transaction indices means that, between parallel pipelines, they are operating on a same transaction. For example, given two memory requests, the first considered transaction 0 and the second considered transaction 1, all of the parallel pipelines track a transaction 0 and a transaction 1.

In an example, the parallel pipeline result is stored in a result buffer that is exclusive to the parallel pipeline. This buffer can be combined with the vectors described below or be separate from these vectors. In this example, the result (e.g., data returned from cache 210) is held in the result buffer until it is ready to be merged with the results from another pipeline. Because the buffer is exclusive to the parallel pipeline, there is a result buffer for each parallel pipeline. This provides an efficient to implement mechanism to hold onto the results. In an example, the buffer is shared among the parallel pipelines. In this example, metadata, such as a tag, is used to separate which results correspond to which parallel pipelines.

The merge circuitry 290 is configured to mark an element (e.g., index) in a vector that corresponds to the transaction index. Here, the vector is a member of a set of vectors with each member of the set of vectors uniquely assigned to members of the set of parallel pipelines. Thus, each parallel pipeline has its own vector in the set of vectors. Moreover, a given index in any vector corresponds to a transaction such that the same index in another vector corresponds to the same transaction. Generally, transaction 0 will be index 0 across all vectors of the set of vectors. Accordingly, if pipeline A completes transaction 0 and pipeline B has not, index zero of pipeline A's vector will indicate that the transaction is complete and index 0 of pipeline B's vector will indicate that the transaction is not complete.

In an example, the members of the set of vectors are bit vectors. Thus, each element of a vector holds a single bit. Here, the bit vector can be represented as one or more words in registers of the merge circuitry 290. Such a representation can be convenient to implement, both in storage of the vector as well as comparing vectors to determine whether a given transaction is complete as described below. In an example, to mark an element in a bit vector, the merge circuitry 290 is configured to set the element to a logical one. Using the logical one to indicate completion and a logical zero to indicate that the transaction is not complete can be convenient when using standard bit-wise comparison operations, such as a bit-wise AND operation, to compare transaction status across pipelines.

As noted above, a result buffer can be used to hold pipeline results prior to merging. In an example, the result buffer is a data structure with a storage bin for each element in the vector. Here, the result buffer closely tracks the transaction complete vector. Thus, the completed result for transaction 2, e.g., index 2, includes the result. In an example, the presence of the result serves as the indication that the transaction is complete. Here, the result buffer merges into the vector for the pipeline. In an example, a separate transaction status indication is included in the vector along with the result. In an example, the result buffer is completely separate to the vector, organized as a FIFO, a stack, or other data structure.

In an example, the merge circuitry 290 is configured to obtain a divergence of a pipeline into the set of parallel pipelines and create the set of vectors. This example provides a degree of flexibility in the vector creation and use. For example, if the cache 210 is hosted in static RAM (SRAM) on the memory controller 205, some SRAM can be used to hold the vectors or result buffers. Thus, the amount of SRAM consumed for these structures can be modified on-the-fly based on the merge circuitry 290 determining how many active parallel pipelines are in use. Such flexibility, and possible complexity, can be avoided, however, if the number of parallel pipelines is fixed.

The merge circuitry 290 is configured to compare elements in the members of the set of vectors that correspond to the transaction index. The comparison can be performed in response to marking a vector element, upon expiration of an interval (e.g., after one clock cycle), upon an interrupt from the cache controller 215 or the off-die memory controller 220, etc. In any case, the comparison determines which transactions are complete. Thus, with respect to a complete transaction, the comparison on the transaction index determines that the transaction corresponding to that index is complete. Thus, the merge circuitry 290 is configured to look at the transaction complete indications in a single index across the vectors of the parallel pipelines. For example, if index 1 of the vector for pipeline A and index 1 of the vector for pipeline B both indicate completion, then the transaction 1 that corresponds to index 1 is complete.

In an example, when the vectors are bit vectors, the merge circuitry 290 is configured to compare elements in the members of the set of bit vectors by performing a bit-wise operation upon entire members (e.g., upon all indices in the vectors). For example, given three 256-bit vectors, a logical AND operation is performed between all three vectors to produce a single 256-bit result. Such an operation can generally be implemented within a single clock cycle. In an example, the bitwise operation is an AND operation. In an example, the transaction is complete when the result of the AND operation that corresponds to the transaction index is a logical one. The AND operation, with transaction completions being marked with a logical one, is a convenient mechanism to determine that every vector is complete because a logical one in a given index of the result vector entails a logical one at the same index in all of the parallel pipeline vectors.

It is possible for a transaction to be complete if less than all pipelines complete. For example, if the transaction involves a single memory data unit, then either the cache 210 or the off-die memory satisfies the transaction. However, both locations can be checked in parallel to avoid, for example, latency associated with waiting for a cache miss before making the off-die memory inquiry. In these examples, the merge circuitry 190 can be configured to use a bitwise OR operation as the bitwise operation. In an example, the transaction is complete when the result of the OR operation that corresponds to the transaction index is a logical one. As long as any pipeline vector has a logical one at the transaction index, the transaction is complete. Because the implementation of a bitwise AND and a bitwise OR can consume little hardware area in the merge circuitry 290, both can be included and performed on each clock cycle, for example. In this manner, the merge circuitry has two result vectors, consulting the appropriate result vector based on metadata about each transaction. Thus, the AND result vector can be consulted for a transaction when all pipelines must complete, and the OR vector consulted when only one pipeline must complete.

The merge circuitry 290 is configured to release the result to an output buffer in response to the transaction being complete. Thus, as the transaction is finished, the various elements making up the transaction are ready to be output to the final path (e.g., creation and delivery of a memory response). In an example, to release the result to the output buffer, the merge circuitry 290 is configured to transfer the result from the result buffer to the output buffer.

In an example, the output buffer is one of a set of output buffers. In an example, a cardinality (e.g., total number) of the set of output buffers is equal to a number of possible simultaneous results at a given progression element. The set of output buffers addresses latency issues that can arise when multiple simultaneous pipeline completions occur. In order to enable all simultaneous completions to transfer to the output buffer in a single clock cycle, for example, a separate output buffer structure is used for each simultaneous completion. However, which of the set of output buffers is used has no other meaning. Thus, in an example, releasing results to the set of output buffers includes writing the results to the output buffers in a round-robin sequence. In an example, the merge circuitry 290 is configured to read the result out of the output buffer in a round-robin sequence as well. Reading and writing to the set of output buffers in a round robin fashion avoids complex coordination between the output buffers to avoid locking, starvation, or other queue management issues.

In an example, the merge circuitry 290 is configured to clear the element in the vector in response to reading the result out of the output buffer. Clearing the vector elements enables the vector element to be used in a new transaction. In these examples, the merge circuitry 290 can maintain a pointer of the next transaction to process in order to avoid confusing a completed and cleared transaction with an incomplete transaction. The vectors can be considered a circular vector, or buffer, in these examples.

Figure 3:
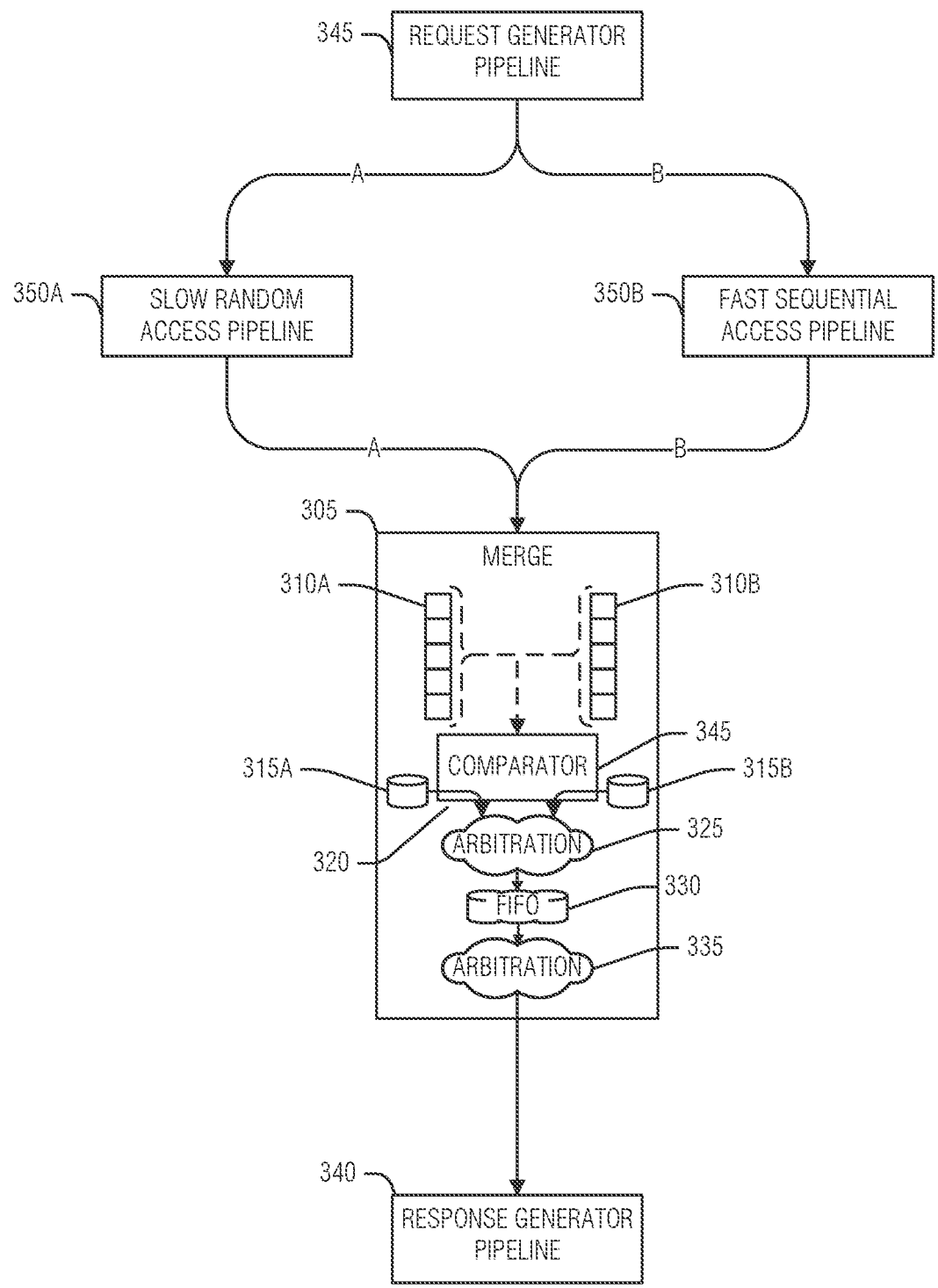
FIG. 3 illustrates a processing flow through circuit components, according to an embodiment.

FIG. 3 illustrates a processing flow through circuit components, according to an embodiment. As illustrated, there is a request generator pipeline 345 (e.g., the packet decoder 230 from FIG. 2), that can split into a, relatively, slow pipeline 350A (e.g., off-die memory 280 from FIG. 2) and a fast pipeline 350B (e.g., cache 210 from FIG. 2). A merge component 305 (e.g., merge circuitry 290 from FIG. 2) merges results from the slow pipeline 350A and the fast pipeline 350B and provides the results to a response generator pipeline 340 (e.g., the packet encoder 240 from FIG. 2). The merge component 305 includes an interface to receive results from the slow pipeline 350A and the fast pipeline 350B.

The merge component 305 includes vectors for the pipelines, such as vector 310 for the slow pipeline 350A and vector 310B for the fast pipeline 350B. The merge component 305 includes vector update circuitry configured to mark elements in the vectors 310 based on pipeline results received form the interface. The merge component 305 also includes result buffers for the pipelines, result buffer 315A for the slow pipeline 350A and result buffer 315B for the fast pipeline 350B.

When the vectors 310A and 310B indicate that a transaction is complete (e.g., by the comparator 345), arbitration circuitry 325 can deliver the results (e.g., from the result buffers 315A and 351B) to the set of output buffers 330 in a round-robin fashion. The arbitration circuitry 335 can then extract the now merged results from the set of output buffers 330 in a round-robin fashion. The arbitration circuitry 325 and arbitration circuitry 335 are coordinated in design such that the order of results placed into the set of output buffers 330 is maintained when the results are removed (e.g., read) from the set of output buffer 330 and delivered to the response generator pipeline 340.

Figure 4:
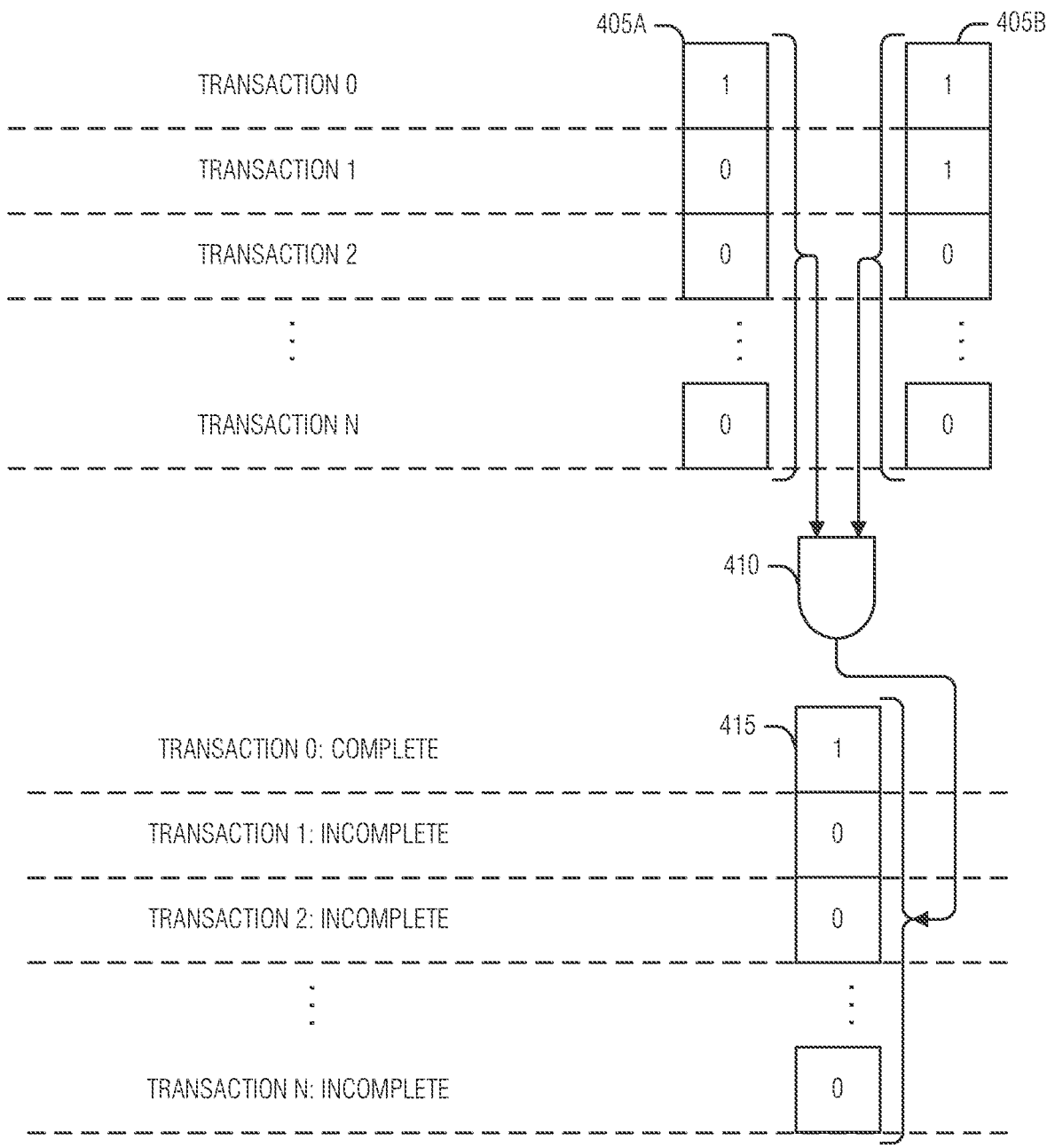
FIG. 4 illustrates comparing vector elements to determine whether a transaction is complete, according to an embodiment.

FIG. 4 illustrates comparing vector elements to determine whether a transaction is complete, according to an embodiment. As illustrated the bit vector 405A corresponds to pipeline A and vector 405B corresponds to pipeline B. During the vector comparison, the entire vectors 405A and 405B are subject to a logical AND operation 410 to produce a result vector 415 with the same number of elements as the vectors 405A and 405B.

Each index on every one of vector 405A, 405B, and 415 corresponds to a specific transaction. As illustrated, pipeline B has completed results for transactions 0 and 1 and no other transactions. Pipeline A has completed results for only transaction 0. Under the logical AND operation 410, transaction 0 in the result vector is set to a logical one and all other elements corresponding to other possible transactions are set to logical zero. Thus, under this comparison, only transaction 0 is complete. If a logical OR operation had been applied, the element for transaction 1 in the result vector 415 would have a logical one and also indicate that the transaction is complete.

Figure 5:
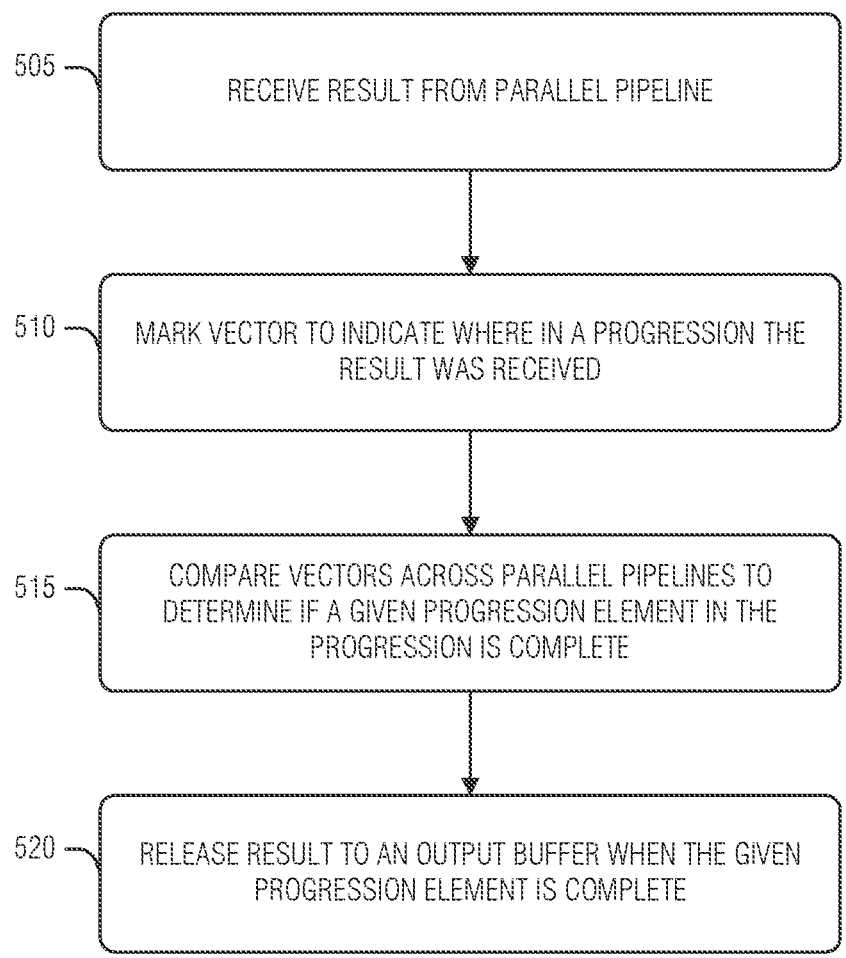
FIG. 5 is a flow chart of an example of a method for pipeline merging in a circuit according to an embodiment.

FIG. 5 is a flow chart of an example of a method 500 for pipeline merging in a circuit according to an embodiment. Operations of the method 500 are performed by computer hardware, such as that described with respect to FIG. 1 (e.g., memory controller chiplet 140), FIG. 2 (memory controller), or FIG. 6 (e.g., processing circuitry). In an example, the operations are performed by a circuit of a memory controller on an output path of the memory controller. Here, the output path is between an interface exiting the memory controller and memory managed by the memory controller. In an example, the memory managed by the memory controller includes memory on the memory controller chiplet (e.g., cache) and memory that is not on the memory controller chiplet (e.g., off-die memory).

At operation 505, a parallel pipeline result for a transaction index of a parallel pipeline is obtained. Here, the parallel pipeline is a member of a set of parallel pipelines that share transaction indices. In an example, the parallel pipeline result is stored in a result buffer that is exclusive to the parallel pipeline.

At operation 510, an element in a vector is marked that corresponds to the transaction index. The vector is a member of a set of vectors with each member of the set of vectors uniquely assigned to members of the set of parallel pipelines. To achieve the shared transaction indices, each element in the vector corresponds to a possible transaction index for the set of parallel pipelines with respective elements between members of the set of vectors corresponding to the same transaction index. In an example, members of the set of vectors are bit vectors. In an example, marking the element is setting the element to a logical one. In an example, the result buffer is a data structure with a storage bin for each element in the vector. In an example, the operations of the method 500 can be extended to include obtaining a divergence of a pipeline into the set of parallel pipelines and creating the set of vectors.

At operation 515, elements in the members of the set of vectors that correspond to the transaction index are compared. The comparison determines which transactions are complete. Thus, with respect to a complete transaction, the comparison on the transaction index determines that the transaction corresponding to that index is complete.

In an example, when the vectors are bit vectors, comparing elements in the members of the set of bit vectors includes performing a bit-wise operation upon entire members. For example, given three 256-bit vectors, a logical AND operation is performed between all three vectors to produce a single 256-bit result. In an example, the bitwise operation is an AND operation. In an example, the transaction is complete when the result of the AND operation that corresponds to the transaction index is a logical one. In an example, the bitwise operation is an OR operation. In an example, the transaction is complete when the result of the OR operation that corresponds to the transaction index is a logical one.

At operation 520, the result is released to an output buffer in response to the transaction being complete. In an example, releasing the result to the output buffer includes transferring the result from the result buffer to the output buffer. In an example, the output buffer is one of a set of output buffers. In an example, a cardinality (e.g., total number) of the set of output buffers is equal to a number of possible simultaneous results at a given progression element. In an example, releasing results to the set of output buffers includes writing the results to the output buffers in a round-robin sequence. In an example, the operations of the method 500 can be extended to include reading the result out of the output buffer and clearing the element in the vector in response to reading the result out of the output buffer.

Figure 6:
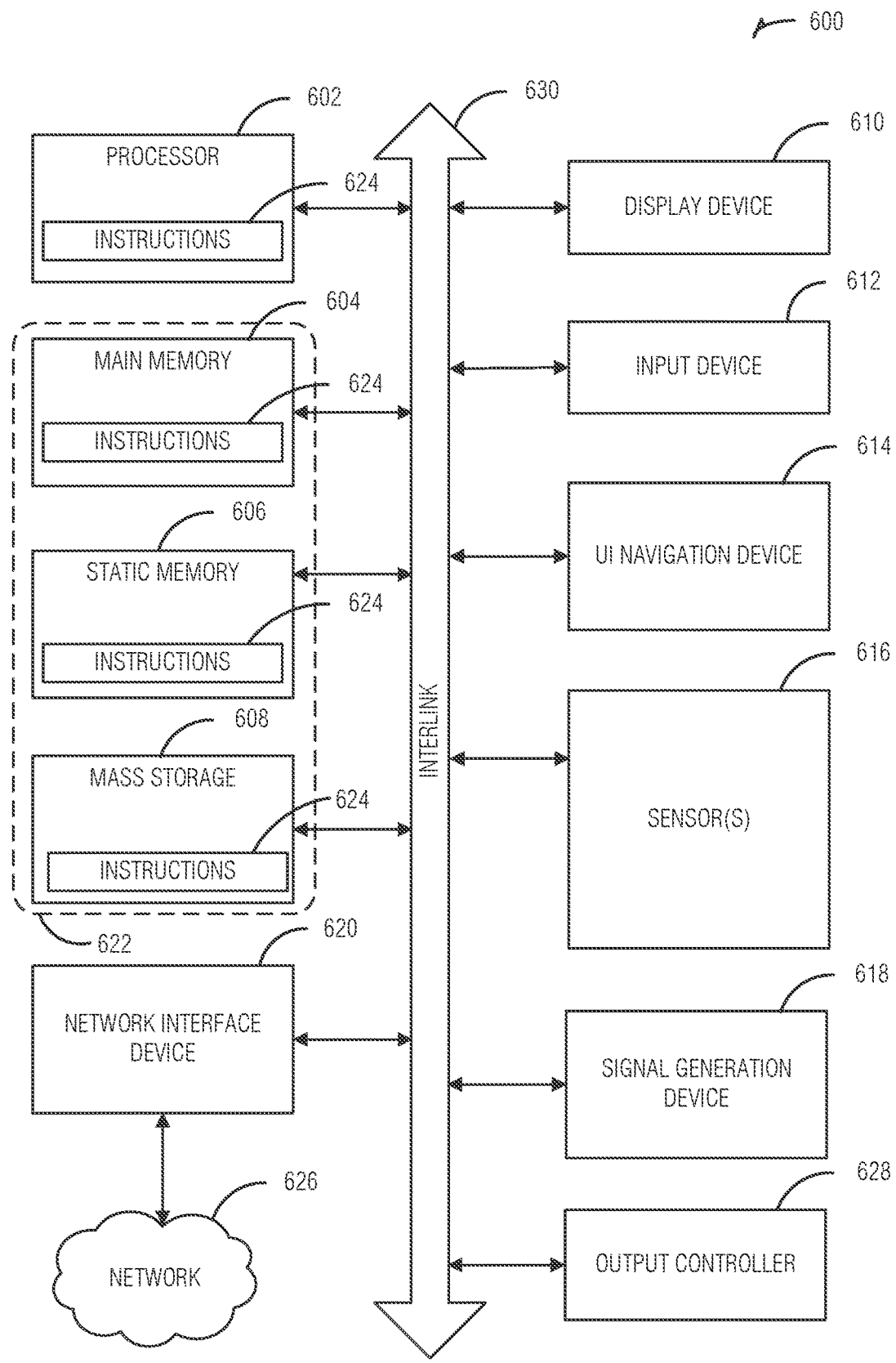
FIG. 6 is a block diagram of an example of a machine with which, in which, or by which embodiments of the present disclosure can operate.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is a merge circuitry comprising: an interface configured to obtain a parallel pipeline result for a transaction index of a parallel pipeline, the parallel pipeline being a member of a set of parallel pipelines that share transaction indices; a set of vectors including a vector, each member of the set of vectors uniquely assigned to members of the set of parallel pipelines, each element in the vector corresponding to a possible transaction index for the set of parallel pipelines, and respective elements between members of the set of vectors corresponding to a same transaction index; vector update circuitry configured to mark an element in the vector that corresponds to the transaction index; a comparator configured to compare elements in the members of the set of vectors that correspond to the transaction index to determine that a transaction is complete; and an arbiter configured to release the result to an output buffer in response to the transaction being complete.

In Example 2, the subject matter of Example 1, wherein members of the set of vectors are bit vectors, wherein, to mark the element, the vector update circuitry is configured to set the element to a logical one, and wherein, to compare elements in the members of the set of bit vectors, the comparator is configured to perform a bit-wise operation upon entire members.

In Example 3, the subject matter of Example 2, wherein the bitwise operation is an AND operation, and wherein the transaction is complete when the result of the AND operation that corresponds to the transaction index is a logical one.

In Example 4, the subject matter of any of Examples 2-3 wherein the bitwise operation is an OR operation, and wherein the transaction is complete when the result of the OR operation that corresponds to the transaction index is a logical one.

In Example 5, the subject matter of any of Examples 1-4, wherein, to obtain the parallel pipeline result, the interface is configured to store the parallel pipeline result in a result buffer that is exclusive to the parallel pipeline.

In Example 6, the subject matter of Example 5, wherein the result buffer is a data structure with a storage bin for each element in the vector.

In Example 7, the subject matter of any of Examples 5-6, wherein, to release the result to the output buffer, the arbiter is configured to transfer the result from the result buffer to the output buffer.

In Example 8, the subject matter of any of Examples 1-7, wherein the output buffer is one of a set of output buffers, a cardinality of the set of output buffers being equal to a number of possible simultaneous results at a given progression element.

In Example 9, the subject matter of Example 8, wherein, to release results to the set of output buffers, the arbiter is configured to write the results to the output buffers in a round-robin sequence.

In Example 10, the subject matter of any of Examples 1-9, comprising a second arbiter configured to read the result out of the output buffer, and wherein the vector update circuitry is configured to clear the element in the vector in response to reading the result out of the output buffer.

In Example 11, the subject matter of any of Examples 1-10, wherein the merge circuitry is included in a memory controller chiplet in a chiplet system.

In Example 12, the subject matter of Example 11, wherein the merge circuitry is placed on an output path of the memory controller chiplet, the output path being placed between an interface exiting the memory controller and memory managed by the memory controller.

In Example 13, the subject matter of Example 12, wherein memory managed by the memory controller includes memory on the memory controller chiplet and memory that is not on the memory controller chiplet.

Example 14 is a method comprising: obtaining, by merge circuitry, a parallel pipeline result for a transaction index of a parallel pipeline, the parallel pipeline being a member of a set of parallel pipelines that share transaction indices; marking an element, in a vector, that corresponds to the transaction index, the vector being a member of a set of vectors, each member of the set of vectors uniquely assigned to members of the set of parallel pipelines, each element in the vector corresponding to a possible transaction index for the set of parallel pipelines, and respective elements between members of the set of vectors corresponding to a same transaction index; comparing elements in the members of the set of vectors that correspond to the transaction index to determine that a transaction is complete; and releasing the result to an output buffer in response to the transaction being complete.

In Example 15, the subject matter of Example 14, wherein members of the set of vectors are bit vectors, wherein marking the element is setting the element to a logical one, and wherein comparing elements in the members of the set of bit vectors includes performing a bit-wise operation upon entire members.

In Example 16, the subject matter of Example 15, wherein the bitwise operation is an AND operation, and wherein the transaction is complete when the result of the AND operation that corresponds to the transaction index is a logical one.

In Example 17, the subject matter of any of Examples 15-16 wherein the bitwise operation is an OR operation, and wherein the transaction is complete when the result of the OR operation that corresponds to the transaction index is a logical one.

In Example 18, the subject matter of any of Examples 14-17, wherein obtaining the parallel pipeline result includes storing the parallel pipeline result in a result buffer that is exclusive to the parallel pipeline.

In Example 19, the subject matter of Example 18, wherein the result buffer is a data structure with a storage bin for each element in the vector.

In Example 20, the subject matter of any of Examples 18-19, wherein releasing the result to the output buffer includes transferring the result from the result buffer to the output buffer.

In Example 21, the subject matter of any of Examples 14-20, wherein the output buffer is one of a set of output buffers, a cardinality of the set of output buffers being equal to a number of possible simultaneous results at a given progression element.

In Example 22, the subject matter of Example 21, wherein releasing results to the set of output buffers includes writing the results to the output buffers in a round-robin sequence.

In Example 23, the subject matter of any of Examples 14-22, comprising: reading the result out of the output buffer; and clearing the element in the vector in response to reading the result out of the output buffer.

In Example 24, the subject matter of any of Examples 14-23, comprising: obtaining a divergence of a pipeline into the set of parallel pipelines; and creating the set of vectors.

In Example 25, the subject matter of any of Examples 14-24, wherein the merge circuitry is included in a memory controller chiplet in a chiplet system.

In Example 26, the subject matter of Example 25, wherein the merge circuitry is placed on an output path of the memory controller chiplet, the output path being placed between an interface exiting the memory controller and memory managed by the memory controller.

In Example 27, the subject matter of Example 26, wherein memory managed by the memory controller includes memory on the memory controller chiplet and memory that is not on the memory controller chiplet.

Example 28 is a machine-readable medium including instructions that, when executed by merge circuitry, cause the merge circuitry to perform operations comprising: obtaining a parallel pipeline result for a transaction index of a parallel pipeline, the parallel pipeline being a member of a set of parallel pipelines that share transaction indices; marking an element, in a vector, that corresponds to the transaction index, the vector being a member of a set of vectors, each member of the set of vectors uniquely assigned to members of the set of parallel pipelines, each element in the vector corresponding to a possible transaction index for the set of parallel pipelines, and respective elements between members of the set of vectors corresponding to a same transaction index; comparing elements in the members of the set of vectors that correspond to the transaction index to determine that a transaction is complete; and releasing the result to an output buffer in response to the transaction being complete.

In Example 29, the subject matter of Example 28, wherein members of the set of vectors are bit vectors, wherein marking the element is setting the element to a logical one, and wherein comparing elements in the members of the set of bit vectors includes performing a bit-wise operation upon entire members.

In Example 30, the subject matter of Example 29, wherein the bitwise operation is an AND operation, and wherein the transaction is complete when the result of the AND operation that corresponds to the transaction index is a logical one.

In Example 31, the subject matter of any of Examples 29-30 wherein the bitwise operation is an OR operation, and wherein the transaction is complete when the result of the OR operation that corresponds to the transaction index is a logical one.

In Example 32, the subject matter of any of Examples 28-31, wherein obtaining the parallel pipeline result includes storing the parallel pipeline result in a result buffer that is exclusive to the parallel pipeline.

In Example 33, the subject matter of Example 32, wherein the result buffer is a data structure with a storage bin for each element in the vector.

In Example 34, the subject matter of any of Examples 32-33, wherein releasing the result to the output buffer includes transferring the result from the result buffer to the output buffer.

In Example 35, the subject matter of any of Examples 28-34, wherein the output buffer is one of a set of output buffers, a cardinality of the set of output buffers being equal to a number of possible simultaneous results at a given progression element.

In Example 36, the subject matter of Example 35, wherein releasing results to the set of output buffers includes writing the results to the output buffers in a round-robin sequence.

In Example 37, the subject matter of any of Examples 28-36, wherein the operations comprise: reading the result out of the output buffer; and clearing the element in the vector in response to reading the result out of the output buffer.

In Example 38, the subject matter of any of Examples 28-37, wherein the operations comprise: obtaining a divergence of a pipeline into the set of parallel pipelines; and creating the set of vectors.

In Example 39, the subject matter of any of Examples 28-38, wherein the merge circuitry is included in a memory controller chiplet in a chiplet system.

In Example 40, the subject matter of Example 39, wherein the merge circuitry is placed on an output path of the memory controller chiplet, the output path being placed between an interface exiting the memory controller and memory managed by the memory controller.

In Example 41, the subject matter of Example 40, wherein memory managed by the memory controller includes memory on the memory controller chiplet and memory that is not on the memory controller chiplet.

Example 42 is a system comprising: means for obtaining, by merge circuitry, a parallel pipeline result for a transaction index of a parallel pipeline, the parallel pipeline being a member of a set of parallel pipelines that share transaction indices; means for marking an element, in a vector, that corresponds to the transaction index, the vector being a member of a set of vectors, each member of the set of vectors uniquely assigned to members of the set of parallel pipelines, each element in the vector corresponding to a possible transaction index for the set of parallel pipelines, and respective elements between members of the set of vectors corresponding to a same transaction index; means for comparing elements in the members of the set of vectors that correspond to the transaction index to determine that a transaction is complete; and means for releasing the result to an output buffer in response to the transaction being complete.

In Example 43, the subject matter of Example 42, wherein members of the set of vectors are bit vectors, wherein marking the element is setting the element to a logical one, and wherein the means for comparing elements in the members of the set of bit vectors include means for performing a bit-wise operation upon entire members.

In Example 44, the subject matter of Example 43, wherein the bitwise operation is an AND operation, and wherein the transaction is complete when the result of the AND operation that corresponds to the transaction index is a logical one.

In Example 45, the subject matter of any of Examples 43-44 wherein the bitwise operation is an OR operation, and wherein the transaction is complete when the result of the OR operation that corresponds to the transaction index is a logical one.

In Example 46, the subject matter of any of Examples 42-45, wherein the means for obtaining the parallel pipeline result include means for storing the parallel pipeline result in a result buffer that is exclusive to the parallel pipeline.

In Example 47, the subject matter of Example 46, wherein the result buffer is a data structure with a storage bin for each element in the vector.

In Example 48, the subject matter of any of Examples 46-47, wherein the means for releasing the result to the output buffer include means for transferring the result from the result buffer to the output buffer.

In Example 49, the subject matter of any of Examples 42-48, wherein the output buffer is one of a set of output buffers, a cardinality of the set of output buffers being equal to a number of possible simultaneous results at a given progression element.

In Example 50, the subject matter of Example 49, wherein the means for releasing results to the set of output buffers include means for writing the results to the output buffers in a round-robin sequence.

In Example 51, the subject matter of any of Examples 42-50, comprising: means for reading the result out of the output buffer; and means for clearing the element in the vector in response to reading the result out of the output buffer.

In Example 52, the subject matter of any of Examples 42-51, comprising: means for obtaining a divergence of a pipeline into the set of parallel pipelines; and means for creating the set of vectors.

In Example 53, the subject matter of any of Examples 42-52, wherein the merge circuitry is included in a memory controller chiplet in a chiplet system.

In Example 54, the subject matter of Example 53, wherein the merge circuitry is placed on an output path of the memory controller chiplet, the output path being placed between an interface exiting the memory controller and memory managed by the memory controller.

In Example 55, the subject matter of Example 54, wherein memory managed by the memory controller includes memory on the memory controller chiplet and memory that is not on the memory controller chiplet.

Example 56 is at least one machine-readable medium including instructions that, when executed by processing circuitry, cause the processing circuitry to perform operations to implement of any of Examples 1-55.

Example 57 is an apparatus comprising means to implement of any of Examples 1-55.

Example 58 is a system to implement of any of Examples 1-55.

Example 59 is a method to implement of any of Examples 1-55.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   vector hardware including multiple vectors, each vector of the multiple vectors assigned to a different parallel pipeline of a set of parallel pipelines, an element in a vector corresponding to an index for a possible transaction in a respective parallel pipeline, transaction indices being shared across the set of parallel pipelines;
   vector update circuitry configured to mark an element in a vector of the multiple vectors, the element corresponding to a transaction index of a parallel pipeline result in a parallel pipeline to which the vector is assigned; and
   an arbiter configured to release the parallel pipeline result to an output buffer in response to a comparison of the transaction index across the multiple vectors indicating that the transaction is complete.

2. The apparatus of claim 1, wherein each of the multiple vectors are bit vectors, and wherein the element in the vector is a single bit.

3. The apparatus of claim 2, wherein, to mark the element in the vector, the vector update circuitry is configured to set the element to a logical one.

4. The apparatus of claim 2, comprising comparator circuitry, wherein the comparison of the transaction is performed by the comparator circuitry configured to perform a bit-wise operation across the multiple vectors.

5. The apparatus of claim 4, wherein the bitwise operation is an AND operation, and wherein the transaction is complete when the result of the AND operation is a logical one.

6. The apparatus of claim 4, wherein the bitwise operation is an OR operation, and wherein the transaction is complete when the result of the OR operation that corresponds to the transaction index is a logical one.

7. The apparatus of claim 1, comprising an interface configured to obtain the parallel pipeline result for the transaction index.

8. The apparatus of claim 7, wherein, to obtain the parallel pipeline result, the interface is configured to store the parallel pipeline result in a result buffer that is exclusive to the parallel pipeline.

9. The apparatus of claim 8, wherein the result buffer is a data structure with a storage bin for each element in the vector.

10. The apparatus of claim 8, wherein, to release the parallel pipeline result to the output buffer, the arbiter is configured to transfer the result from the result buffer to the output buffer.

11. The apparatus of claim 1, wherein the output buffer is one of a set of output buffers with a number equal to possible simultaneous results at a given progression element.

12. The apparatus of claim 11, wherein the arbiter is configured to write results to the output buffers in a round-robin sequence.

13. The apparatus of claim 1, comprising a second arbiter configured to read the parallel pipeline result out of the output buffer.

14. The apparatus of claim 13, wherein the vector update circuitry is configured to clear the element in the vector in response to reading the result out of the output buffer.

15. The apparatus of claim 1, wherein the apparatus is included in a memory controller.

16. The apparatus of claim 15, wherein the memory controller is a chiplet in a chiplet system.

17. The apparatus of claim 16, wherein memory managed by the memory controller includes memory on the chiplet and memory that is not on the chiplet.

18. The apparatus of claim 15, wherein the apparatus is positioned in an output path of the memory controller, the output path being from the memory controller to an external component.

19. The apparatus of claim 18, wherein the external component is a second chiplet in the chiplet system.

20. The apparatus of claim 19, wherein the output path is part of a chiplet network that connects the chiplet and the second chiplet.

* * * * *